Jan. 12, 1960  A. A. ANDERSON  2,920,860
VALVE
Filed May 10, 1956
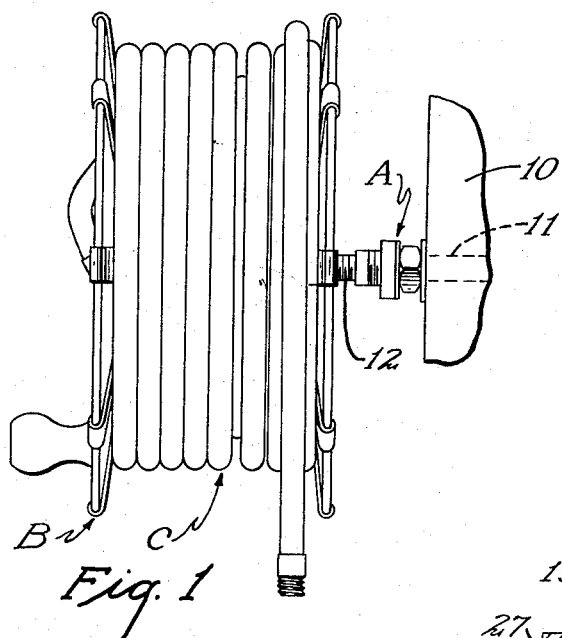
Fig. 1
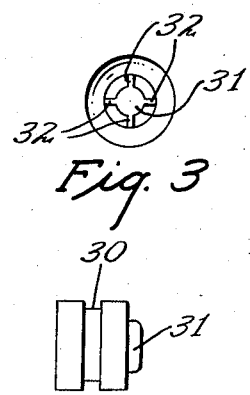
Fig. 3
Fig. 4
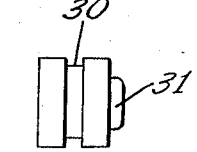
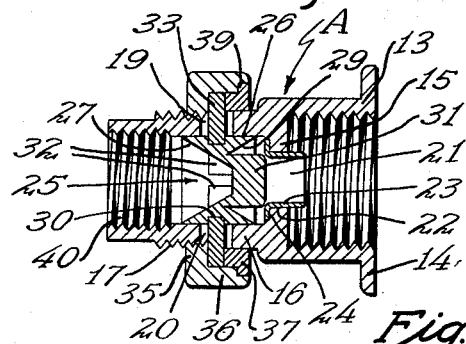
Fig. 2
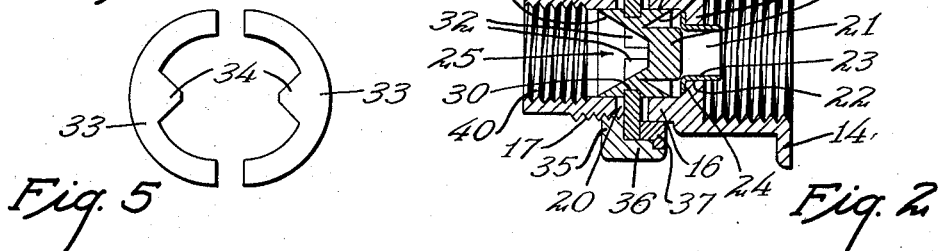
Fig. 5
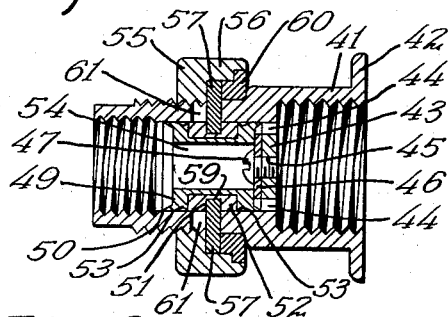
Fig. 6
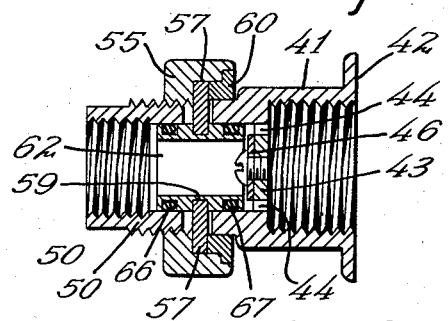
Fig. 8
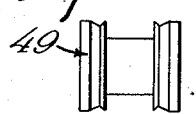
Fig. 7
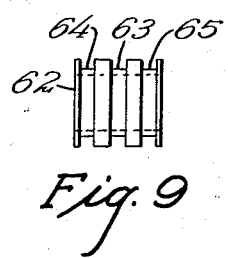
Fig. 9
INVENTOR
Arthur A. Anderson
BY Robert M. Dunning
ATTORNEY

United States Patent Office 2,920,860
Patented Jan. 12, 1960

2,920,860
VALVE

Arthur A. Anderson, St. Paul, Minn., assignor to Specialty Manufacturing Co., St. Paul, Minn., a corporation of Minnesota Application May 10, 1956, Serial No. 584,086

6 Claims. (Cl. 251—340)

This invention relates to an improvement in valves and deals particularly with a shutoff valve useable in hose connections and for various other purposes.

Numerous types of valves have been produced which are designed for general use. Most such valves greatly reduce the flow of fluid in the line. Furthermore, in most such valves a considerable change of direction in the flow of fluid is required. It is, accordingly, an object of the present invention to provide a valve through which water may flow with less difficulty than with valves of usual type.

On object of the present invention resides in the provision of a valve having a partition wall intermediate its ends which is apertured to permit the flow of fluid therefor. A valve element is slidably supported in the valve for movement toward or away from the partitioned wall. This valve element is actuated by a nut encircling the tubular body member of the valve and threaded thereupon. By rotation of the nut on the exterior of the valve, the valve element can be moved toward or away from its seat.

A feature of the present invention resides in the provision of a valve having one or more slots in the periphery of the valve tubular body member through which a valve moving element may extend. The valve moving element is moved by means of a nut encircling the tubular body of member. By rotation of the nut in one direction, the valve moving element may be moved longitudinally in the slot or slots thereby moving the valve element longitudinally of the tubular body member and toward or away from the cooperable valve seat.

A feature of the present invention resides in the simplicity of construction of the valve. The valve moving element is preferably a split ring having one or more projections designed to extend through slots in the tubular valve body member. The nut threaded upon the exterior surface of the tubular body member encloses the valve moving element and holds the parts thereof assembled and in proper relation. The valve moving element fits with a sliding fit within the internally threaded nut and is moved longitudinally thereby, the projections sliding longitudinally of the slots in the valve tubular body member.

A further feature of the present invention resides in the fact that the slidable valve element may comprise either the valve plug portion or the valve seat. In either event the slidable element is moved against the fixed abutment to close the valve.

A further feature of the present invention resides in the fact that the slidable valve element is provided with sealing means engageable with the walls of the tubular valve body to form a seal thereagainst.

These and other objects and novel features of my invention will be more clearly and fully set forth in the following specification and claims.

In the drawings forming a part of the specification:

Figure 1 discloses a typical valve installation wherein the valve controls the flow of water to a hose reel;

Figure 2 is a cross sectional view through the valve showing the construction thereof;

Figure 3 is an end elevational view of the slidable member of the valve employed in the construction shown in Figure 2;

Figure 4 is a side elevational view of the movable valve element shown in the construction illustrated in Figure 2;

Figure 5 is an end elevational view of the valve moving element of the valve;

Figure 6 is a sectional view of a modified form of valve construction;

Figure 7 is a side elevational view of the movable valve element which may be used in the valve illustrated in Figure 6;

Figure 8 is a sectional view through another form of valve construction; and

Figure 9 is a side elevational view of the movable portion of the valve shown in Figure 8.

Figure 1 illustrates a typical use for a valve of the particular type disclosed. In this figure the numeral 10 indicates the side of a house or building through which a water pipe 11 extends. The valve A is threaded upon the projecting end of the pipe 11 and accommodates an extension tube 12 which forms the axis of the hose reel B. The hose reel B may be of any suitable type, the details of which are not illustrated in the drawings. When the valve A is opened, water will flow into the hose C wound upon the hose reel B. In other installations the valve may be used between sections of hose or may be used in any arrangement where the flow of fluid is to be controlled. The valve A is shown in detail in Figure 2 of the drawings. The valve includes an internally threaded tubular body member 13 which may be provided with a peripheral flange 14 at one end thereof designed to engage against the surface of the house or building. A partition wall 15 is provided at the inner extremity of the internally threaded tubular body member 13. A sleeve 16 which is shown of slightly smaller exterior diameter projects beyond the partition wall 15 and forms a part of the tubular body member of the valve. The exterior surface of the sleeve 16 is threaded, as indicated by the numeral 17. The sleeve 16 is provided with two opposed longitudinally elongated slots 19 and 20 therein. These slots are preferably provided with sides which taper inwardly to fit the valve moving means.

A valve seat 21 is frictionally engaged in a central aperture 22 in the partition wall 15. The seat 21 includes a cylindrical sleeve 23 having a peripheral flange 24 at one end thereof. The flange 24 is designed to extend against the side of the partition wall 15 facing the smaller diameter sleeve 16. The valve seat 21 is preferably formed of plastic material such as nylon or Teflon but could be made of stainless steel or other such material if preferred.

A movable valve element is indicated in general by numeral 25. This element includes a cylindrical outer surface 26 having inwardly tapered conical surfaces 27 and 29 which form knife edges at the juncture of the cylindrical outer surface and the conical tapered surface. A groove 30 is provided between the ends of the valve element extending into the peripheral cylindrical surface for a purpose which will be later described.

Integral with the inner surface of the valve element is provided a plug 31 which is of slightly larger diameter than the internal diameter of the sleeve 23. As is indicated in Figures 2 and 3 of the drawings, the plug 31 is connected to the remainder of the valve by angularly spaced webs 32 which provide fluid spaces therebetween. The plug 31 is tapered to a smaller diameter at its point of connection with the remainder of the valve element so as to provide relatively large spaces through which water may fluently flow.

Valve moving elements 33 encircle the sleeve 16 and in effect comprise a split ring having inwardly projecting tapered fingers 34 thereupon. These tapered fingers 34 are shaped similarly to the elongated slots 19 and 20 and are of sufficient length to extend through these slots and into the peripheral groove 30 about the movable valve element. Thus the valve element may rotate if desired relative to the body of the valve or relative to the valve moving means.

A nut 35, having a cylindrical flange 36 projecting from one side thereof, encircles the sleeve 16 and is threaded thereon. A ring 37 encircles the sleeve 16 with a sliding fit and is press fit into the flange 36 to form in effect an integral part thereof. When thus engaged, the nut comprises a hollow cylindrical body having a groove in its inner surface. A shoulder 39 on the flange 36 and on the ring 37 limits the inward movement of the ring and permits the ring to slide about the valve moving element 33 with a running fit.

It will be seen that rotation of the nut 35 in one direction will act to slide the valve moving means 33 to the right as viewed in Figure 2, forcing the valve plug 31 against the seat 21 and forming a seal between these parts. Rotation of the nut 35 in a direction to unthread a nut from the sleeve 16 acts to move the slidable valve member to the left, permitting fluid to flow between the plug 31 and the valve seat and between the angularly spaced ribs 32 to pass through the internally threaded outlet end 40 of the sleeve 16.

It will be noted that the conical inner surfaces 27 and 29 form feather edges at opposite ends of the movable valve element and the water under pressure acts to seal these thin edges against the encircling tubular wall. This is particularly possible when the movable valve element is made of Teflon or nylon or a similar plastic material.

In Figures 6 and 7 another form of valve construction is illustrated. The outer portion of the valve is identical to that previously described. An internally threaded tubular body member 41 may be provided with a flange 42 at one end thereof if the valve is to be located adjoining a wall. A partition wall 43 is provided at the inner end of the socket 41. This partition wall 43 is provided with a series of angularly spaced apertures 44 near its outer periphery, these passages forming fluid spaces through the valve. The center portion of the partition wall is provided with a threaded axial aperture 45 therethrough. A washer like valve plug end 46 is held in place upon the center portion of the partition wall 43 by a machine screw 47. The washer 46 extends only to the inner surfaces of the angularly spaced apertures 44.

An elongated hollow cylinder 49 is slidably supported within a tubular sleeve 50 extending on the opposite side of the partition wall 43 from the flanged end of the tubular body member 41. This cylindrical valve element 49 may be provided with a peripheral groove 51 therein, but in the particular arrangement illustrated the valve element 49 is provided with a cylindrical metal insert 52 therein in which the groove 51 is formed. The ends of the hollow cylindrical element 49 are outwardly beveled, as indicated at 53, to provide feather edges at each end of the movable valve element.

It will be seen that movement of the valve element 49 longitudinally of the tubular sleeve 50 acts in one position to abut against the valve plug member 46 to form a seal. When moved away from the partition wall 43, fluid may flow through the passages 44 in the partition wall and through the center opening 54 of the valve element 49.

As in the previous structure, the exterior surface of the sleeve 50 is threaded to accommodate the cylindrical nut 55. This nut includes a cylindrical flange 56 which is designed to encircle a pair of valve moving means 57 which are identical with the valve moving elements 33 shown in Figure 5. Projections 59 on the moving elements 57 engage in the groove 51 and permit the valve element to be moved longitudinally upon rotating movement of the nut 55. A ring 60 is pressed into the flange 56 to enclose the periphery of the valve moving elements 57 and the projections 59 thereof extend through longitudinally extending slots 61 in the sleeve 50.

Upon rotation of the nut 55 on the threads of the sleeve 50, the movable valve element 49 may be moved toward or away from the plug element 46 on the partition wall 43.

In Figures 8 and 9 of the drawings a third form of valve is illustrated which differs in certain details from the previously described constructions. As the tubular body member of the valve is identical to that illustrated in Figure 6 of the drawings, the same identifying numerals have been employed both for the tubular body member of the valve and for the valve moving means 57. The only difference lies in the movable valve element which in Figure 8 is identified by the numeral 62.

The element 62, as shown in Figure 9, comprises a hollow cylindrical body having a center groove 63 and two outer grooves 64 and 65. The valve element may be of brass or other metal whereas, in preferred form, the valve element 49 is made of nylon, Teflon or another plastic material.

The center groove 63 is designed to accommodate the inwardly extending projections 59 of the valve moving means 57. The outer grooves are designed to accommodate sealing rings and preferably the type known as quad rings and which are indicated at 66 and 67. These rings 66 and 67 are generally rectangular in shape but are provided with edges which seal snugly against the interior of the tubular portion 50 of the valve body to form a seal thereagainst.

The operation of the valve shown in Figure 8 is identical to that previously described. Upon rotation of the nut 55 in one direction, the movable valve element will be forced against the plug member 46 on the partition wall 43 to form a seal. Upon rotation of the nut in the opposite direction, the movable valve element will be moved away from the plug member 46 and liquid may flow through the partition wall passages 44 and through the central passage of the valve member 62.

In accordance with the patent statutes, I have described the principles of construction and operation of my valves, and while I have endeavored to set forth the best embodiment thereof, I desire to have it understood that obvious changes may be made within the scope of the following claims without departing from the spirit of my invention.

I claim:

1. A valve including an elongated tubular body member, a partition wall intermediate the ends of said body, a movable valve element axially movable in said tubular member, aperture means in said partition and cooperable sealing means on said movable valve element, said movable valve element having aperture means therethrough through which fluid may flow when said movable valve element is not in engagement with said partition wall, a pair of spaced elongated slots in said tubular body member, a nut threaded upon the external surface of said tubular member, a pair of semi-circular ring members encircling said tubular body member within said nut, and integral projection means on said ring members extending through said slots and engaging said movable valve element, said projection means being formed integrally with said ring members, said projection means being moved longitudinally of said slots upon rotary movement of said nut to cause corresponding axial movement of said movable valve element.

2. The construction described in claim 1 and in which said movable valve element includes a peripheral groove into which said projecting means extends.

3. A valve including an elongated externally threaded tubular body member having a partition wall intermediate its ends, said partition wall having an aperture therethrough, a movable valve element slidably supported for axial movement in said tubular body member and engageable with said partition wall for closing said aperture, said movable valve element having a fluid passage therethrough which is closed when said movable valve element is moved against said partition wall, an external recess in said movable valve element, a pair of longitudinally extending slots in said tubular body member outwardly of said external recess, a nut threaded upon said tubular body member, and a pair of abutting semi-circular ring members encircling said tubular body member within said nut, inwardly projecting means on said ring members extending through said slots and into said external recess in said movable valve element, said projection means being formed integrally with said ring members, rotary movement of said nut causing longitudinal movement of said movable valve element.

4. The construction described in claim 3 and in which the aperture in said partition wall is coaxail therewith and said fluid passage through said movable valve element is off set from the center thereof.

5. A valve including an elongated tubular body member having a partition wall intermediate the ends thereof, said partition wall having a central aperture therethrough, a valve seat encircling said aperture, a movable valve element having a projecting plug thereupon engageable against said seat, passages through said movable valve element outwardly of said plug but inwardly of the outer periphery of said valve element, said valve element being in sliding contact with said tubular body member and having a peripheral groove therein, longitudinally extending slots in said tubular body member, a nut threaded upon the external surface of said tubular body member, a pair of abutting, flat semi-circular ring elements each having an integral inwardly extending projection tapering toward its free end, said ring elements encircling said tubular body member with said projections extending through said slots and into said groove, said nut engaging said last named elements for moving the same longitudinally upon rotary movement of said nut.

6. The construction described in claim 5 and in which said movable valve element includes feather edges at each end of the valve element along the area of contact with said tubular body member.

References Cited in the file of this patent

UNITED STATES PATENTS

| 2,126,856 | Yancey | Aug. 16, 1938 |
| 2,245,097 | Tobler | June 10, 1941 |
| 2,600,976 | Dalrymple | June 17, 1952 |
| 2,612,337 | Maynard | Sept. 30, 1952 |

FOREIGN PATENTS

| 56,197 | France | June 18, 1952 |
| 1,056,286 | France | of 1954 |